P. H. PITTS.
Turning Lathe.
No. 106,404. Patented Aug. 16, 1870.
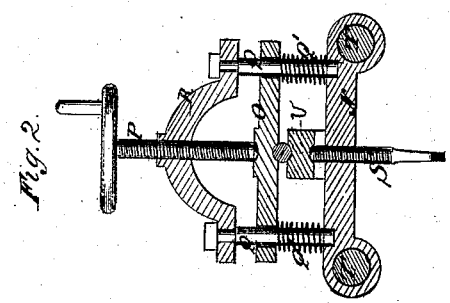
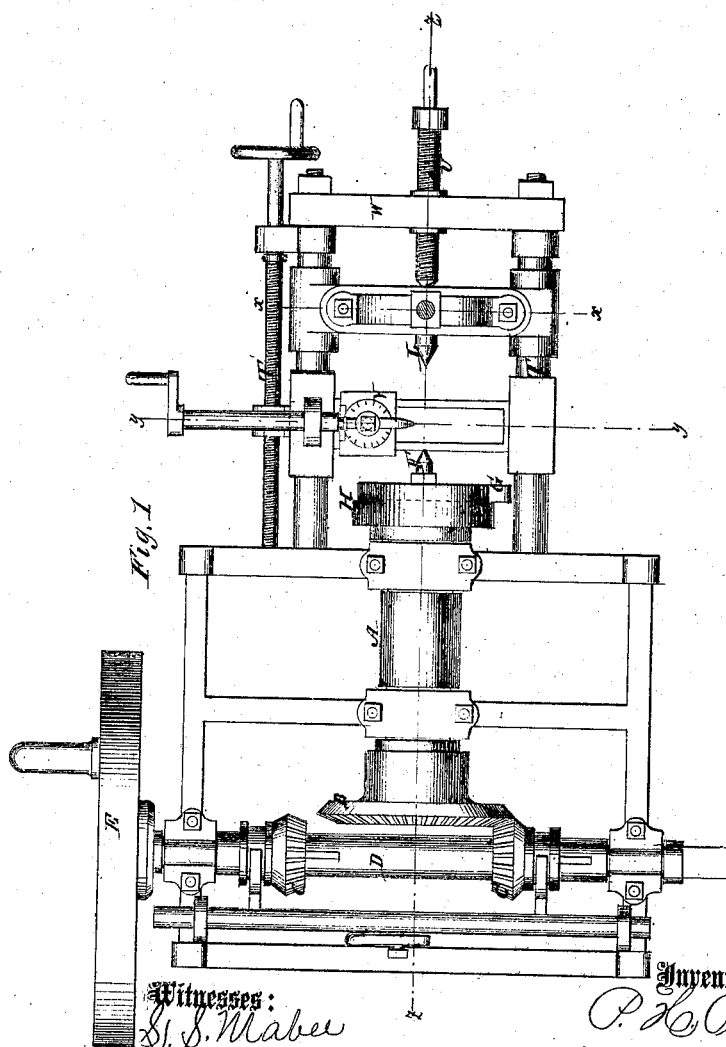
Witnesses:
D. S. Mabee
Geo. W. Mabee
Inventor:
P. H. Pitts
per Munn & Co
Attorneys.

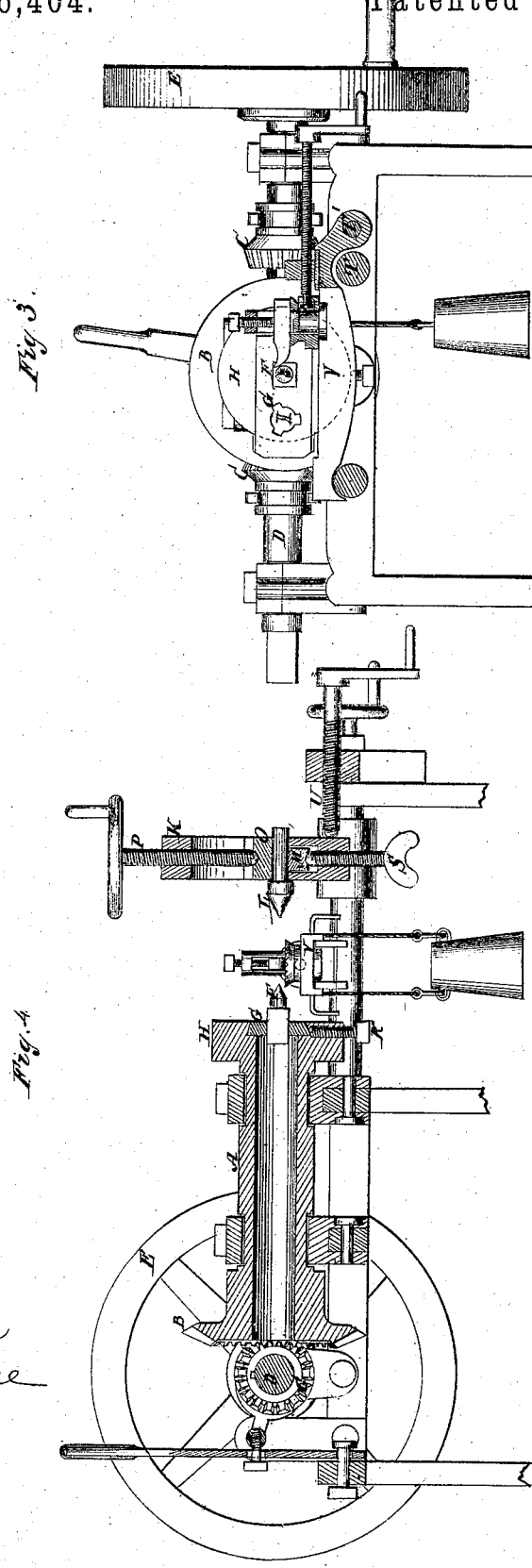

United States Patent Office.

PHILLIP H. PITTS, OF WAVERLY, MISSOURI.

Letters Patent No. 106,404, dated August 16, 1870.

IMPROVEMENT IN LATHES.

The Schedule referred to in these Letters Patent and making part of the same.

*To all whom it may concern:*

Be it known that I, PHILLIP H. PITTS, of Waverly, in the county of Lafayette and State of Missouri, have invented a new and useful Improvement in Turning and Screw-cutting Lathes; and I do hereby declare that the following is a full, clear, and exact description thereof, which will enable others skilled in the art to make and use the same, reference being had to the accompanying drawing forming part of this specification.

This invention relates to improvements in turning and screw-cutting lathes, and consists in a lathe so arranged that by shifting some of the parts it may be readily adjusted either for turning or cutting screw-threads on bolts.

Figure 1 is a plan view of a lathe constructed according to my improvements.

Figure 2 is a transverse section on the line $x\,x$.

Figure 3 is a transverse section on the line $y\,y$.

Figure 4 is a longitudinal section on the line $z\,z$.

Similar letters of reference indicate corresponding parts.

A is the live spindle; it is made hollow, and mounted in fixed bearings, and provided with driving gear, whereby it may be turned in either direction.

The said gear consists of the bevel-wheel B, pinion C, shaft D, and driving-pulley E.

The pinions are placed on opposite sides of the wheel B, and are arranged in the ordinary way for shifting the connection from one to the other.

The center F of the live spindle is mounted in a plate, G, arranged in a groove across the face of the face-plate H to slide back and forth thereon, and has a screw-cutting die, I, in it, which may be brought to coincide with the axis. This plate is secured in any required position by a set-screw, K, or it may be by any other means.

The tail-center L is supported between a vertically adjustable block, M, mounted on a slide, N, and a clamping-bar, O, screwed down upon it by the hand-screw P, and working on the rods Q rising from the said slide.

The screw works through a yoke, R, attached to the slide N by the rods Q. The latter are provided with springs Q', to raise the bar O when the screw is raised.

The block M is adjusted by a screw, S, screwing up through the slide N.

This slide works on the ways T to and from the face-plate H, and is moved up toward it by a feed-screw, U, screwing through the cross-bar W.

The tool-support V is arranged on the ways T, and the feed-screws T', so that it can be swung over on the feed-screw off from the ways T.

A weight is used to hold it firmly on the ways to prevent chattering. The weight is taken off when the slide is raised.

For turning the bolts or other articles, the centers F L are placed in the position represented in fig. 1, and the turning is done in the ordinary way; but for threading bolts the plate G is moved along the groove in the face-plate H, to adjust it so that the die will coincide with the axis of the mandrel A.

The tail-center L is removed and the tool-rest is swung off the ways T'.

The bolt to be threaded is then clamped in the place of the said center and moved up and forced into the die by the screw U. It is discharged from the die after cutting by reversing the motion of the mandrel and screwing it out again.

For cutting the threads on bolts of different sizes, other plates, G, are provided with dies of different sizes.

The adjusting block M admits of holding-rods of any size, so as to coincide with the axis of the die.

This machine may also be used for drilling, the drill being tapped in the place of the screw-taps, and the thing to be drilled held against the face-plate.

Having thus described my invention,

I claim as new and desire to secure by Letters Patent—

1. The device for supporting and adjusting the tail-center, consisting of the slide N, yoke R, bar O, rods Q, block M, springs Q', and screws P and S, as described.

2. The combination, with the mandrel, face-plate, and centers of a lathe, of the device for supporting and adjusting the tail-center, the tool-rest V, and feed-screw T', arranged relatively thereto, as described.

3. The arrangement of the live center and screw-cutting die in plate G, and of the latter in the groove across the surface of the face-plate, as described.

4. The arrangement described in relation to the ways T, and to each other, of the lathe-rest V and feed-screw T'.

PHILLIP H. PITTS.

Witnesses:
SAMUEL COLLINS,
RICHARD D. CANTHORN.